Jan. 27, 1970      E. J. ECHTERLING      3,491,461
EDUCATIONAL TOY DEVICE FOR AUDIBLY REPRODUCING
RECORDED TEACHING MATERIAL
Filed Feb. 9, 1967      2 Sheets-Sheet 2
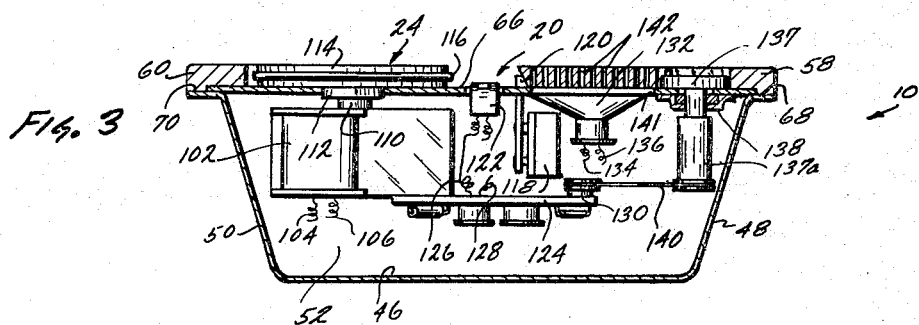
INVENTOR
EUGENE J. ECHTERLING
BY Herzig, Walsh & Blackham
ATTORNEYS

United States Patent Office 3,491,461
Patented Jan. 27, 1970

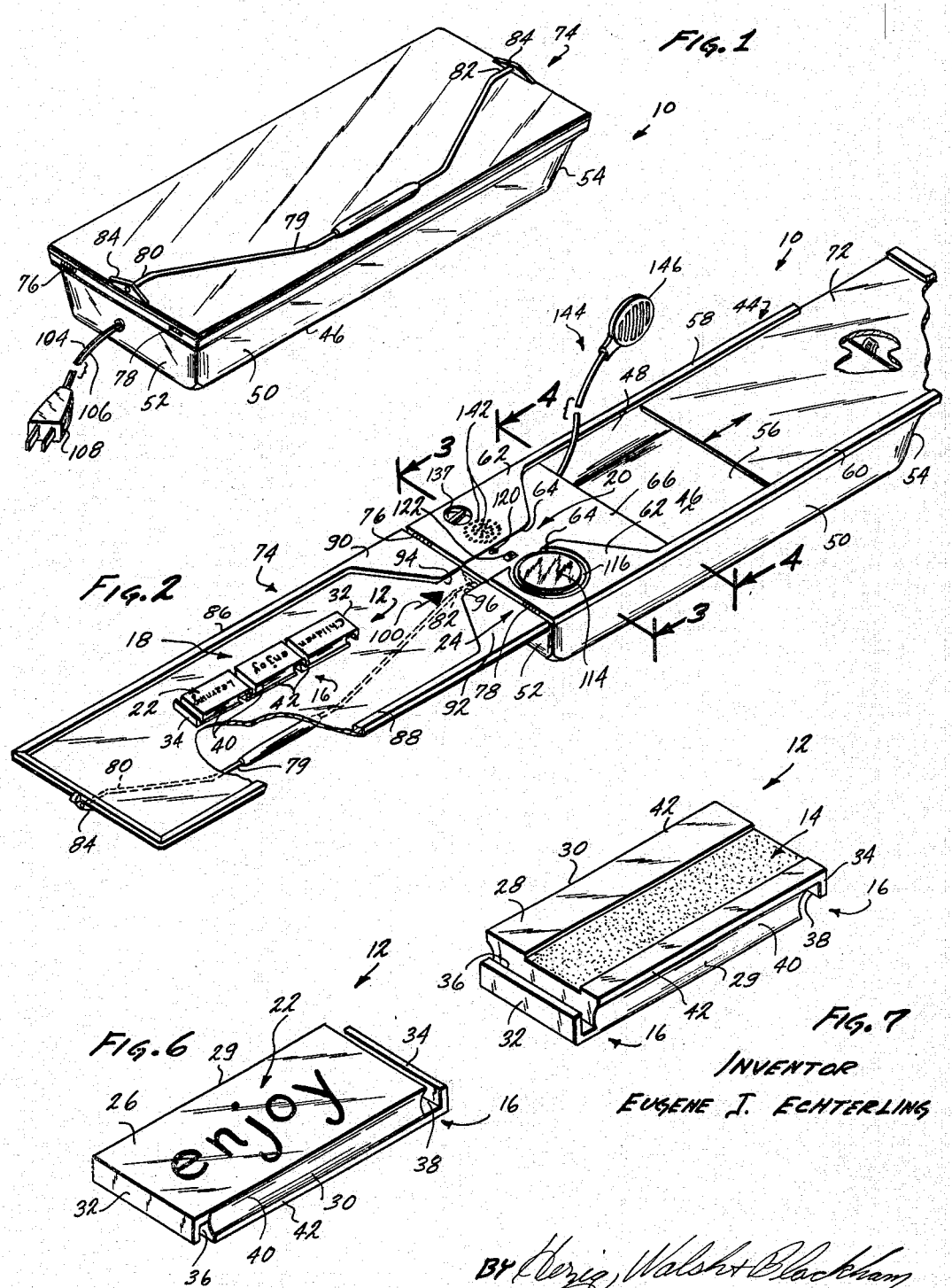

3,491,461
EDUCATIONAL TOY DEVICE FOR AUDIBLY REPRODUCING RECORDED TEACHING MATERIAL
Eugene J. Echterling, Manhattan Beach, Calif., assignor to Mattel, Inc., Hawthorne, Calif., a corporation of California
Filed Feb. 9, 1967, Ser. No. 614,981
Int. Cl. G09b 19/04
U.S. Cl. 35—35          4 Claims

ABSTRACT OF THE DISCLOSURE

Individual blocks have words both printed and recorded thereon. A plurality of blocks may be joined together to form a train-like array. This array may then be run through a player which translates the information carried by each block into an audible sound.

BACKGROUND OF THE INVENTION

The background of the invention is set forth in two parts:

Field of the invention

The present invention pertains generally to the field of educational toy devices for audibly reproducing recorded teaching material and more particularly to a chain of teaching sounds for train-like array including sound-carrying means for carrying teaching sound means, connecting means for connecting at least two sound-carrying means together in a train-like array, player means for translating the teaching sound means into audible sound, indicia means provided on the sound-carrying means for conveying a visual image of the teaching sound means and translating means for moving the sound-carrying means in a predetermined linear direction relative to the player means for achieving the audible sound.

Description of the prior art

Educational devices for audibly reproducing recorded teaching material are known. For example, Kallmann Patent No. 2,369,572 discloses a book composed of a series of readable records printed in one column, a series of sound tracks each related and corresponding to one of the readable records printed in a column horizontally adjacent the corresponding readable record and locating means combined with each sound track for mechanically locating a sound head over the sound track. Educational devices of this type have the disadvantage that it is rather inconvenient to properly locate the sound head over the sound tracks. Another disadvantage resides in the fact that this device does not lend itself for use as a toy.

Another example of a prior art educational device for audibly reproducing recorded teaching material may be found in MacChesney et al. Patent No. 2,603,006 and MacChesney Patent No. 2,677,200. These patents each disclose a phonetic sound producing dictionary apparatus having a magnetic tape head provided therein. Cards having indicia showing the proper spelling and pronunciation of words and a magnetic recording of the correct pronunciation of the words may be placed in the apparatus for both visually and audibly conveying the information contained on the cards. Apparatus of this type is also not readily adaptable to use as a toy.

Yet another example of an educational device for audibly reproducing recorded teaching material may be found in Orlick et al. Patent No. 3,087,259. The device disclosed in this patent overcomes some of the disadvantages enumerated above in that it is adapted for use as a toy. The device includes a player and wooden blocks upon which simple words may be both printed and recorded. Each block includes a handle portion for pulling the block through the player to both visually and audibly present an associated word. This device has the disadvantage that a child who is old enough to properly operate the toy soon loses interest in merely running one word at a time through it.

In view of the foregoing factors and conditions characteristic of educational devices for audibly reproducing recorded teaching material, it is a primary object of the present invention to provide a new and useful device of this character not subject to the disadvantages enumerated above and having a chain of teaching sound means for making a train-like array.

Another object of the present invention is to provide a device of the type described which includes sound-carrying means for carrying teaching sound means which are provided with connecting means for connecting at least two sound-carrying means together in a train-like array.

SUMMARY OF THE INVENTION

According to the present invention, there is provided an educational toy device for audibly reproducing recorded teaching material. The device includes sound-carrying means in the form of a plurality of blocks for carrying teaching sound means.

The device also includes player means for translating the teaching sound means into audible sounds and connecting means for connecting a plurality of the blocks together in a train-like array which may be run through the player means.

Indicia means are provided on the sound-carrying means for conveying a visual image of the teaching sound means and translating means are provided for moving the train-like array in a predetermined linear direction relative to the player means for achieving the audible sound.

As shown herein for purposes of illustration, but not of limitation, the player means comprises a magnetic tape player and recorder and magnetic tape is affixed to each block for recording the teaching sound means thereon. If desired, a microphone may be connected to the player means for use by older children in preparing their own teaching sound means.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

BRIEF DESCRIPTION OF THE DRAWINGS

FIGURE 1 is a perspective view of an educational toy device constituting a presently preferred embodiment of the invention;

FIGURE 2 is a perspective view showing the device of FIGURE 1 in its operating mode;

FIGURE 3 is an enlarged, cross-sectional view taken along line 3—3 of FIGURE 2;

FIGURE 4 is an enlarged, cross-sectional view taken along line 4—4 of FIGURE 2;

FIGURE 5 is an enlarged, partial plan view similar to FIGURE 2 showing a sound-carrying means of the present invention in playing position;

FIGURE 6 is a perspective view of a sound-carrying means forming part of the device of FIGURE 1;

FIGURE 7 is a perspective view of an inverted sound-carrying means; and

FIGURE 8 is a partial, elevational view showing a pair of sound-carrying means connected together.

DESCRIPTION OF THE PREFERRED EMBODIMENT

Referring again to the drawings, an educational toy device constituting a presently preferred embodiment of the invention, generally designated 10, includes sound-carrying means 12 for carrying teaching sound means 14 (FIGURE 7), connecting means 16 for connecting at least two sound-carrying means 12 together in a train-like array 18 (FIGURE 8), player means 20 for translating the teaching sound means 14 into audible sound, indicia means 22 for conveying a visual image of the teaching sound means 14 and translating means 24 for moving the sound-carrying means 12 in a predetermined linear direction relative to the player means 20 for achieving the audible sound.

Each sound-carrying means 12 and its associated connecting means 16 may be integrally formed in the shape of a block using suitable plastic materials and molding techniques and includes an upper surface 26, a lower surface 28, spaced-apart, parallel side walls 29, 30 and a pair of parallel, spaced-apart end walls 32, 34. One connecting means 16 may be formed in the end wall 32 by providing a U-shaped recess 36 in the lower surface 28 and another connecting means 16 may be provided in the end wall 34 by providing a U-shaped recess 38 in the upper surface 26. The recesses 36 and 38 each extend from side wall 29 to side wall 30. The side walls 29, 30 are each provided with an arcuate recess 40 stopping short of the lower surface 28 thereby leaving a longitudinal rib 42.

The device 10 also includes a housing means 44 having a closed bottom wall 46, a pair of side walls 48, 50, a pair of end walls 52, 54 and an open top 56. The side walls 48, 50 are surmounted by parallel ways 58, 60 each having an enlarged portion 62 having parallel edges 64 forming a channel for guiding blocks 12 over player means 20 adjacent end wall 52. A fixed panel 66 is affixed to the upper edges 68, 70 of side walls 48, 50, respectively, closing open top 56 beneath enlarged portions 62 of the ways 58, 60 and forming a support for player means 20 and translating means 24. A movable panel 72 is slidably mounted in ways 58, 60 for closing the remaining portion of open top 46 when slid to a first position and for permitting access thereto when slid to a second position.

The device 10 also includes a lid 74 which is swingably connected to end wall 52 by a pair of hinges 76, 78 for swinging movements to a closed position, as shown in FIGURE 1, and to an open position, as shown in FIGURE 2. In the closed position, a handle member 79 is accessible and may be used to carry the device 10. The handle 79 includes a first end 80 and a second end 82 which are journalled in associated bearing blocks 84 affixed to lid 74. The handle 79 also serves to support the lid 74 in its FIGURE 2 position in such a manner that lid 74 forms a continuation of a surface defined by fixed panel 66. This surface, generally designated 86, is bounded by a frame 88 having enlarged portions 90, 92 provided with parallel edges 94, 96, respectively, aligned with associated edges 64 forming a continuation of the passageway defined thereby. The frame 88 retains blocks 12 in position on surface 86 while the blocks are being sorted and connected together to form word trains 18, as shown in FIGURE 2. The edges 64, 94 and 96 are undercut, as shown at 98 in FIGURE 4 for one edge 64, to receive ribs 42 when individual blocks 12 or word trains 18 are moved in a predetermined linear direction, as indicated by arrow 100, relative to player means 20.

The translating means 24 includes an electric motor 102 (FIGURE 3) which may be connected in a suitable electric circuit by a pair of leads 104, 106 to which a male plug 108 (FIGURE 1) is affixed. The motor 102 includes an output shaft 110 journalled in a bushing 112 carried by the fixed panel 66. A block-driving wheel 114 is affixed to shaft 110 for rotation thereby and carries a tire 116 which encompasses wheel 114 and which is made from a material having a high coefficient of friction. The tire 116 is adapted to engage the arcuate portion 40 of blocks 12, as shown in FIGURE 5, for moving them through the channel formed by edges 64 of ways 58, 60 to a point of discharge on fixed panel 66. Operation of motor 102 is controlled by a double pole micro switch 118 which also controls the operation of player means 20. The switch 118 includes a toggle 120 which is swingably mounted beneath one edge 64 for engagement by blocks 12. When blocks 12 are moved in the directon of arrow 100, toggle 120 is swung under edge 64 actuating switch 118 and permitting blocks 12 to pass over player means 20. The toggle 120 also serves as a stop means preventing movement of blocks 12 in a direction opposite to that indicated by arrow 100.

Player means 20 includes a pickup head 122 which is connected to an electronic amplifier 124 by a pair of leads 126, 128. The amplifier 124 includes a volume control means 130 which is connected to a loudspeaker means 132 by a pair of leads 134, 136. The volume control means 130 may be adjusted by rotating a knob 137 carried by a spool 137a journalled in a bushing 138 affixed to fixed panel 66. The spool 137a is connected to the volume control means 130 by an endless belt 140. The speaker means 132 is mounted in an opening 141 provided in panel 66 beneath a plurality of apertures 142 provided in the enlarged portion 62 of way 58.

If desired, the enjoyment of device 10 may be enhanced by providing it with recording means, generally designated 144 in FIGURE 2, for recording sounds on the teaching means 14. The recording means 144 includes a microphone 146 which may be connected to an input jack 148 FIGURE 4 by a cable 150. The recording means 144 also includes suitable switching means 152, 154 for switching the player means 20 from a playing mode to a recording mode. The microphone 146 and the blocks 12 may be stored in housing means 44 when not in use.

A child-user of the device 10 may connect the plug 108 to a suitable electrical outlet (not shown) and swing the lid 74 to its FIGURE 2 position where it maybe supported by the handle 79. The child-user may then slide lid or movable panel 72 to its FIGURE 2 position and remove the blocks 12 from housing means 44. The movable panel 72 may then be slid to a closed position against fixed panel 66 forming a continuation of the surface defined by panel 66.

The child-user may then observe the visual image conveyed by the indicia means 22 and translate the teaching sound means 14 into an audible sound by sliding the selected block 12 in the direction of arrow 100 between edges 94 and 96 until block 12 engages toggle 120 energizing motor 102 and amplified 124. Tire 116 then moves block 12 over pickup head 122 and discharges block 12 onto panel 66.

When the child-user becomes familiar with the information carried by a particular block 1, the child-user will be ready to make a chain of teaching sounds for train-like array by engaging the connecting means 16 on one block with the connecting means 16, on another block, shown in FIGURE 8, to form a word-train 18, as shown in FIGURE 2. Although the train 18 is shown herein for purposes of illustration, but not of limitation, as comprising a simple sentence reading "children enjoy learning," it will be apparent that the individual blocks 12 may be provided with any suitable individual bits of information which may be assembled together in suitable training-like arrays.

While the particular educational toy device herein shown and described in detail is fully capable of attaining the objects and providing the advantages hereinbefore stated, it is to be understood that it is merely illustrative of the presently preferred embodiment of the invention and

What is claimed is:
1. An educational toy comprising:
   a plurality of separate members, each of said members comprising a block having a top wall, a bottom wall, a pair of side walls and a pair of end walls, and each bearing thereon a visual symbol on its top wall identifying a particular sound track recording of said particular sound on its bottom wall, at least one of said side walls having an arcuate recess extending along its length;
   said members having complementary interengageable means on each of said end walls whereby a plurality of members may be joined into a unitary chain of members arranged in a desired sequence with said sound track recordings defining a substantially continuous sound track;
   sound reproducing means comprising a transport means and a sound track responsive means; said transport means including a rotatable wheel means engageable in said recess of at least one member of said chain of members to move said entire chain, as a unit, past said sound track responsive means;
   said sound reproducing means and said transport means being mounted in a housing means, said housing means comprising;
   a housing assembly having a closed bottom wall, upstanding side walls, upstanding end walls and an open top, said side walls and said end walls each having an upper edge;
   a fixed panel attached to the upper edges of one of said end walls and one end of said side walls;
   a way affixed to the upper edge of each of said side walls, each of said ways having an enlarged portion extending over said fixed panel, said enlarged portions each including an edge defining said path of travel, said rotatable wheel means having a tire rotatably mounted in one of said edges, said player means being controlled by a switch having a toggle mounted in the other of said edges; and
   movable panel means slidably mounted in said ways.

2. An educational toy as stated in claim 1 including a lid swingably connected to one of said end walls and a carrying handle connected to said lid.

3. An educational toy as stated in claim 2 wherein said handle includes means comprising its shape and location for supporting said lid in an open position in such a manner that said lid comprises a continuation of said fixed panel, said lid being provided with frame means forming a continuation of said path of travel.

4. An educational toy as stated in claim 3 wherein said said teaching sound means comprises magnetic tape and wherein said player means includes recording means for recording said teaching sound means on said tape.

References Cited

UNITED STATES PATENTS

| 2,924,668 | 2/1960 | Hoshino et al. | 35—35 X |
| 3,042,373 | 7/1962 | Berkman. | |
| 3,078,074 | 2/1963 | Benedict | 226—183 X |
| 3,087,259 | 4/1963 | Orlick et al. | 35—35 |
| 3,325,916 | 6/1967 | Greenlee | 35—35 |
| 3,348,320 | 10/1967 | Brokaw | 35—35 |
| 3,391,476 | 7/1968 | Sher | 35—35 |

FOREIGN PATENTS

| 816,076 | 7/1959 | Great Britain. |
| 34,213 | 12/1964 | Germany. |

EUGENE R. CAPOZIO, Primary Examiner

H. S. SKOGQUIST, Assistant Examiner

U.S. Cl. X.R.

274—11